(12) United States Patent
Yamakawa et al.

(10) Patent No.: US 6,860,161 B2
(45) Date of Patent: Mar. 1, 2005

(54) WEIGHT DETECTOR FOR ELEVATOR

(75) Inventors: Shigeki Yamakawa, Tokyo (JP); Kazuhiro Horizaki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/240,262

(22) PCT Filed: Feb. 9, 2001

(86) PCT No.: PCT/JP01/00950
§ 371 (c)(1), (2), (4) Date: Sep. 30, 2002

(87) PCT Pub. No.: WO02/064478
PCT Pub. Date: Aug. 22, 2002

(65) Prior Publication Data
US 2003/0074986 A1 Apr. 24, 2003

(51) Int. Cl.[7] .............................. G01L 5/00; B66B 5/04
(52) U.S. Cl. .................................... 73/862.56; 187/373
(58) Field of Search ....................... 73/862.56, 862.393, 73/862.451; 181/292; 187/373

(56) References Cited
U.S. PATENT DOCUMENTS

| | | | | |
|---|---|---|---|---|
| 4,138,886 A | * | 2/1979 | Lutz et al. ................ | 73/152.44 |
| 4,519,334 A | * | 5/1985 | Knudson ................. | 114/144 R |
| 4,715,478 A | * | 12/1987 | Nakamura et al. .......... | 187/286 |
| 5,418,442 A | | 5/1995 | Araki | |
| 5,441,127 A | * | 8/1995 | Ikejima et al. .............. | 181/292 |
| 5,493,909 A | * | 2/1996 | Araki ....................... | 73/504.08 |
| 5,969,250 A | * | 10/1999 | Greiff ..................... | 73/514.38 |

FOREIGN PATENT DOCUMENTS

| | | |
|---|---|---|
| JP | 1-302772 | 12/1989 |
| JP | 2-8176 | 1/1990 |
| JP | 4-260983 | 9/1992 |
| JP | 4-337818 | 11/1992 |
| JP | 7-101646 | 4/1995 |
| JP | 8-233850 | 9/1996 |
| JP | 9-23015 | 1/1997 |
| JP | 2000-180172 | 6/2000 |
| WO | WO 00-36376 | 6/2000 |
| WO | WO 02-38480 | 11/2000 |

* cited by examiner

*Primary Examiner*—Edward Lefkowitz
*Assistant Examiner*—Lilybett Martir
(74) *Attorney, Agent, or Firm*—Leydig, Voit & Mayer, Ltd.

(57) ABSTRACT

The displacement of a shackle, which is coupled with a main rope hanging an elevator car, caused by loading of the car, is converted, through a wire, into the rotary motion of a pulley which has a substantially vertical rotating surface, and an acceleration sensor for detecting the angle of rotation of the pulley is fixedly secured to the pulley, so that the load of the car is detected from the angle of rotation of the pulley.

11 Claims, 5 Drawing Sheets

WEIGHT DETECTOR FOR ELEVATOR

TECHNICAL FIELD

The present invention relates to a load detection apparatus for an elevator capable of detecting the loading capacity of an elevator car.

BACKGROUND ART

A conventional load detection apparatus for an elevator described in Japanese Patent Application Laid-Open No. 7-101646 is shown in FIG. 9. In this figure, 1 designates main ropes (or ropes), 2 shackles, 3 detection boards, 4 studs, 5 wires, 6 pulleys, and 7 differential transformers.

This load detection apparatus for an elevator is installed in a machine room arranged on the top of a vertical passage for an elevator car. When the plurality of shackles 2, with which end portions of the main ropes 1 for hanging the elevator car are connected, are caused to move under the action of the load of the car, the detection boards 3 are displaced in accordance with the movements of the shackles 2 while being guided by the studs 4, whereby the loading capacity of the car is detected based on the displaced positions of the detection boards.

The displacement of each detection board 3 is once converted into a rotary motion by means of a corresponding pulley 6 through a corresponding wire 5, which is again converted into a linear motion with its direction being changed, whereby a corresponding differential transformer 7 is operated to detect the load. Each differential transformer 7 converts the displacement of a corresponding detection board 3 transmitted through a corresponding wire 5 into an electric signal.

With the conventional apparatus as constructed above, since a space for installation of each differential transformer is required and each differential transformer acting as a sensor has sliding portions, the detection operation is not stabilized for a long period of time, and it is necessary to frequently conduct tests or inspections.

SUMMARY OF INVENTION

The present invention is intended to obviate the problem as referred to above, and has for its object to provide a load detection apparatus for an elevator which is capable of saving or reducing the installation space and maintaining stability in its detection operation for an extended period of time.

In view of the above object, the present invention resides in a load detection apparatus for an elevator which is characterized in that the displacement of a shackle, which is coupled with a main rope hanging an elevator car, caused in accordance with the loading capacity of the car is converted through a wire into the rotary motion of a pulley which has a rotating surface positioned substantially in a vertical posture, and an acceleration sensor for detecting the angle of rotation of the pulley is fixedly secured to the pulley, so that the loading capacity of the car is detected from the angle of rotation of the pulley.

In addition, the load detection apparatus for an elevator is characterized in that in order to generate a frictional force between the wire and the pulley so as to prevent slippage of the wire, a spring is connected with that end of the wire which is opposite to its end near the shackle for pulling the wire in a direction toward the pulley.

Moreover, the load detection apparatus for an elevator is characterized in that in order to generate a frictional force between the wire and the pulley so as to prevent slippage of the wire, a weight is hung from that end of the wire which is opposite to its end near the shackle for pulling the wire in a direction toward the pulley.

Further, the load detection apparatus for an elevator is characterized in that in order to detect the displacement of the shackle, provision is made for a detection board having a surface which is coupled with the shackle in a perpendicular relation thereto so as to be displaced together with the shackle, the wire being connected with the detection board.

Furthermore, the load detection apparatus for an elevator is characterized in that the acceleration sensor is fixedly secured to an outer periphery side of the pulley.

Still further, the load detection apparatus for an elevator is characterized in that the acceleration sensor is fixedly secured to the center of the pulley.

In addition, the load detection apparatus for an elevator is characterized in that the acceleration sensor comprises a semiconductor acceleration sensor, and a temperature maintaining mechanism is provided for maintaining the semiconductor acceleration sensor at a constant temperature.

Moreover, the load detection apparatus for an elevator is characterized in that the temperature maintaining mechanism comprises: a temperature measuring part for measuring the temperature of the semiconductor acceleration sensor; a heater for heating the semiconductor acceleration sensor; and a differential amplifier for driving the heater based on a comparison between the temperature measured by the temperature measuring part and a prescribed reference temperature.

Further, the load detection apparatus for an elevator is characterized in that a chip of the semiconductor acceleration sensor is mounted on a printed circuit board, and the temperature measuring part and the differential amplifier are constituted by a temperature measurement and heater drive circuit built into the semiconductor acceleration sensor chip, and the heater is constituted by a heater transistor supported on the semiconductor acceleration sensor chip by means of a lead.

Furthermore, the load detection apparatus for an elevator is characterized in that the temperature measurement and heater drive circuit comprises a thermistor and a differential amplifier, and the heater transistor comprises a transistor which generates heat by use of a collector loss of the transistor.

Still further, the load detection apparatus for an elevator is characterized in that a high heat-conductive material is inserted between the semiconductor acceleration sensor chip and the heater transistor.

BEST MODE FOR CARRYING OUT THE INVENTION

Embodiment 1

Figure 1:
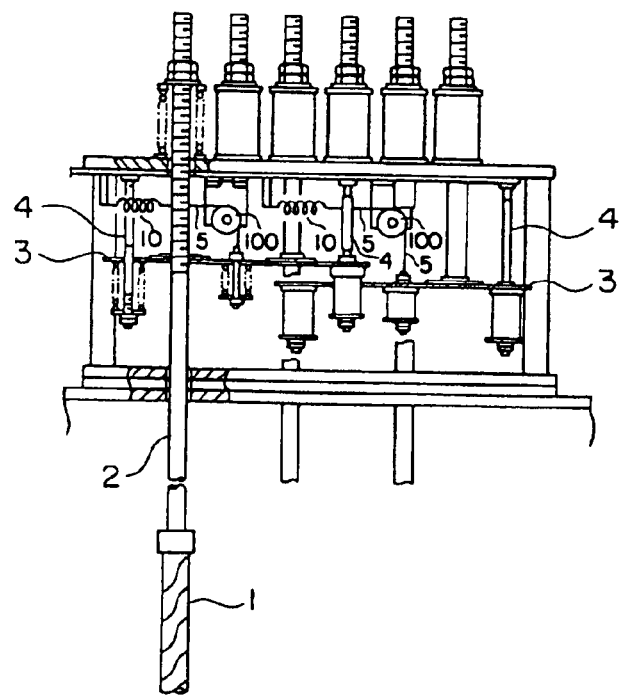
FIG. 1 is a view showing the construction of a load detection apparatus for an elevator according to a first embodiment of the present invention.

FIG. 1 is a view which shows the construction of a load detection apparatus for an elevator according to a first embodiment of the present invention. In this figure, 1 designates main ropes, 2 shackles, 3 detection boards which are coupled with the corresponding shackles 2, respectively, and each of which has a surface arranged perpendicular to a corresponding shackle and capable of being displaced together therewith, 4 studs, 5 wires, 10 springs, 100 pulleys on each of which an acceleration sensor to be described later is installed. The parts same as or corresponding to those of the prior art are identified by the same symbols.

In the present invention, when a detection board 3 engaged with a shackle 2 is displaced in accordance with a variation in the loading capacity of a car associated therewith, a corresponding wire 5 is caused to accordingly move thereby to rotate a corresponding pulley 100, whereby the load of the car is detected by determining the rotational position of that pulley 100 from its reference position by means of the acceleration sensor fixedly mounted thereon.

To prevent the generation of slippage between the pulley 100 and the wire 5, a spring 10 is arranged so as to generate a frictional force therebetween. The wire 5 is urged into pressure engagement with the pulley 100 under the action of the spring 10 so that a frictional force is generated between the pulley 100 and the wire 5, thereby preventing slippage therebetween.

Figure 2:
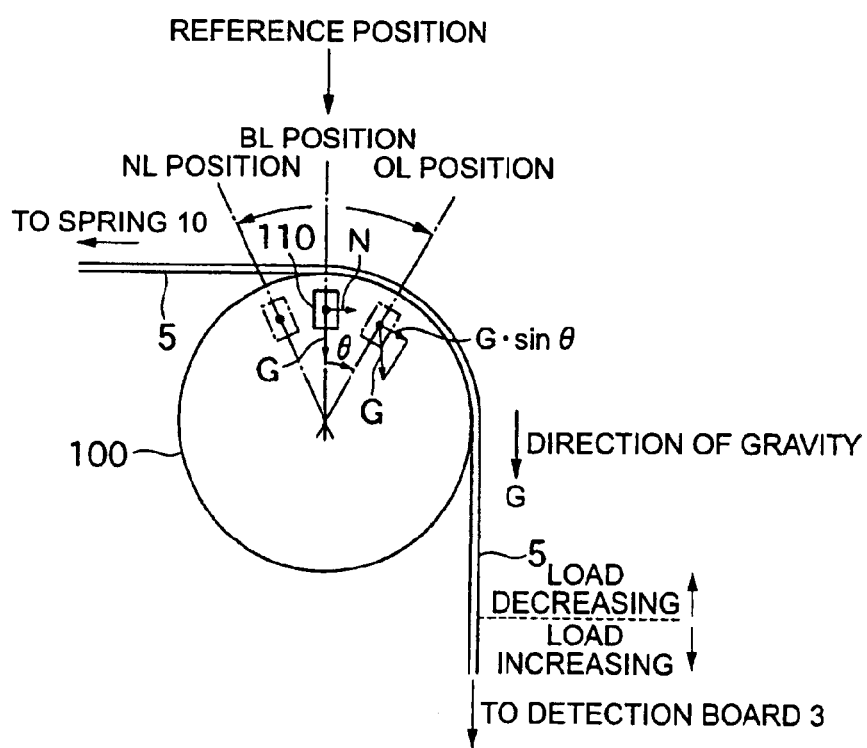
FIG. 2 is an enlarged view showing one example of a pulley on which an acceleration sensor is installed according to the present invention.

FIG. 2 shows an enlarged view of a pulley 100 on which an acceleration sensor 110 is installed. One end of a wire 5 is fixedly secured to a corresponding detection board 3 for example, which is adapted to be displaced under the action of the car load. The other end of the wire 5 is connected with a corresponding spring 10 which serves to urge the wire 5 into pressure engagement with a corresponding pulley 100, thus securing friction for turning the pulley.

In FIG. 2, the wire 5 is pulled in a direction toward the detection board 3 when the load applied thereto is large, so the pulley 100 is caused to rotate in the rightward or clockwise direction in accordance with the movement of the wire. On the other hand, when the load is small, the wire 5 is pulled toward the spring 10 side, thereby causing the pulley 100 to rotate in the leftward or counterclockwise direction.

Now, let us assume that the position of the pulley and hence the acceleration sensor under a maximum load, a medium load (balanced load) and a minimum load is an OL position, a BL position and an NL position, respectively. The acceleration sensor 110 is fixedly mounted on the pulley 100 for detecting a component force of an acceleration of gravity in the direction indicated by an arrow N (i.e., in an arbitrary direction), that is, a component force of an acceleration of gravity in a circumferential direction of the pulley 100 for instance when the pulley is in a reference position (BL position).

Figure 3:
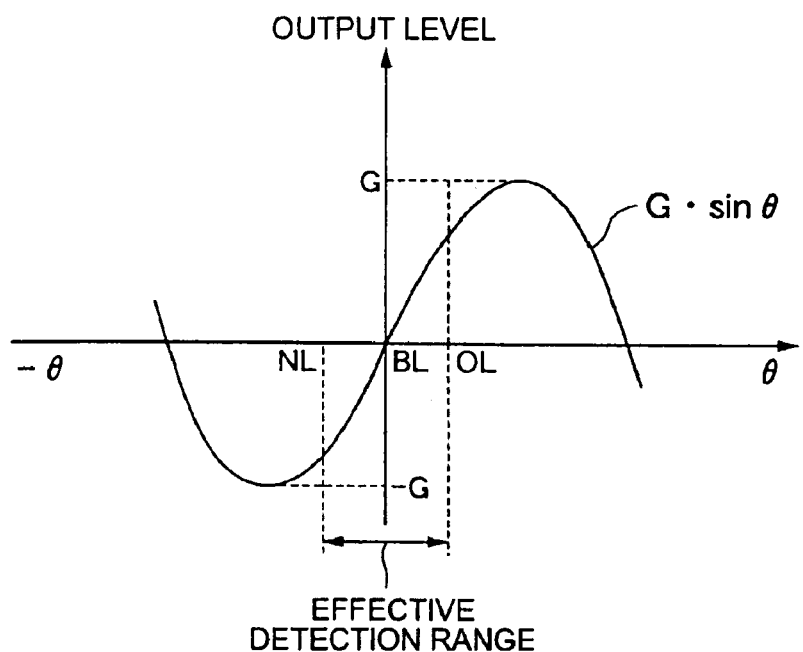
FIG. 3 is a view showing the output of the acceleration sensor according to the present invention.

In FIG. 3, there is shown the output of the acceleration sensor 110 when the pulley 100 is at a rotational angle θ with respect to the reference position (BL position) which is the position of balance in FIG. 2. This output is G·sin θ (G: gravitational acceleration) which is a component force of the gravitational acceleration in a circumferential direction of the pulley 100 (a direction perpendicular to a diametral direction) at a position of the acceleration sensor 110 when the pulley 100 is in a rotational angle of θ.

Here, note that this is the case where the pulley 100 is arranged in a posture standing in the vertical direction, and when a surface of the pulley 100 is inclined with respect to the vertical direction, the output becomes A·sin θ (A: coefficient). In the present invention, it is ideal that the pulley 100 is arranged in a posture standing substantially in the vertical direction.

Accordingly, from the output level of the acceleration sensor 110, there is obtained the rotational angle θ of the pulley 100, which can be converted into the displacement of the detection board 3 and hence the load.

Here, it is to be noted that since the greater the absolute value of the rotational angle θ, the greater becomes the rate of change, the range of effective detection (practical range) becomes from about −20 degrees to about +20 degrees.

In addition, if correction is made based on the output data in an actual machine at two points among the maximum load position OL, the medium load position BL and the minimum load position NL, it is possible to theoretically correct the offset and gain of the acceleration sensor over the entire detection range.

Figure 4:
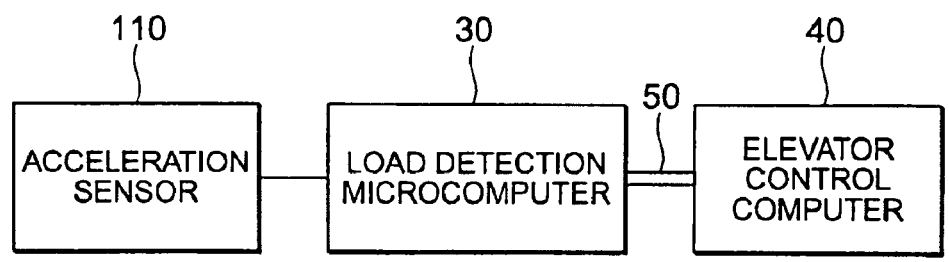
FIG. 4 is a view showing one example of a connection between the acceleration sensor and an elevator control computer according to the present invention.

As shown in FIG. 4, for example, provision is made for a dedicated load detection microcomputer 30 for detecting and processing the output of the acceleration sensor 110 thereby to detect the load. The dedicated load detection microcomputer 30 is connected through a data communication line 50 to an elevator control computer 40 for driving and controlling the elevator.

The result of the load detected by the acceleration sensor 110 can be directly used for driving control of the elevator by performing data communications between the dedicated load detection microcomputer 30 and the elevator control computer 40. By doing so, it becomes possible to perform the elevator control based on highly reliable load data by the use of a minimum chip.

Figure 5:
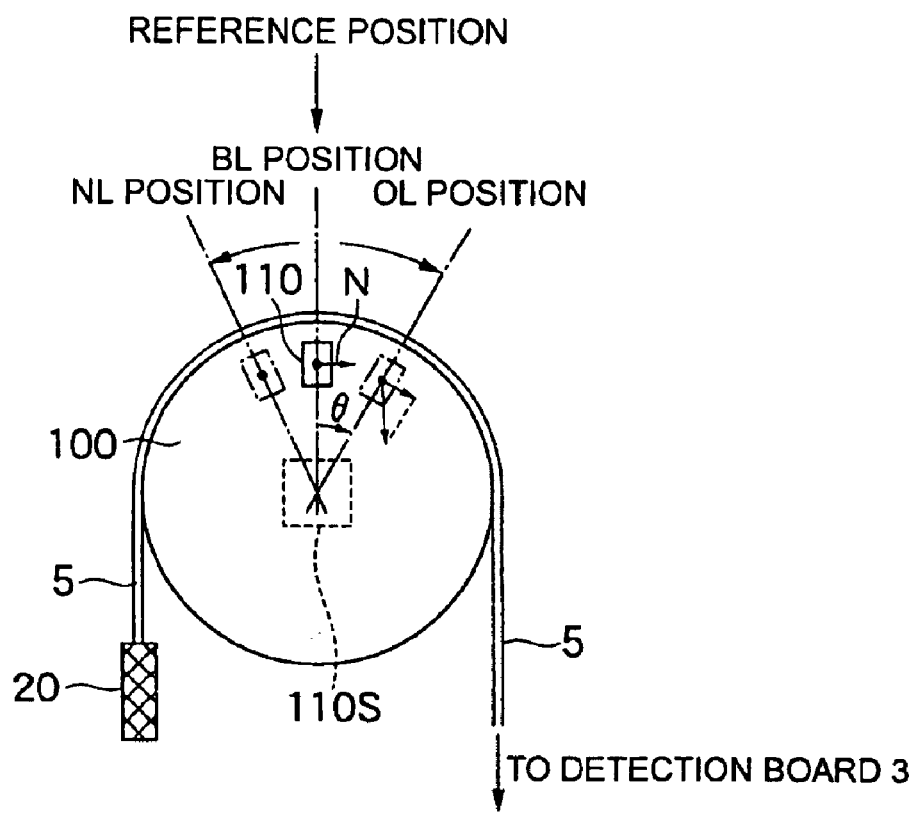
FIG. 5 is an enlarged view showing another example of a pulley on which an acceleration sensor is installed according to the present invention.

In addition, as a mechanism for urging the wire 5 against the pulley 100 side, a weight 20 may be hung on an end of the wire 5 opposite the end thereof connected with the detection board 3 instead of using the spring, as shown in FIG. 5. In this case, too, a frictional force is similarly generated between the pulley 100 and the wire 5, thus preventing slippage therebetween.

Further, the acceleration sensor 110 may be fixed to any portion or place of the pulley 100 as long as it is able to detect the rotational angle of the pulley 100 as a component force of the gravitational acceleration, and hence the mounting position thereof is not limited to the outer peripheral side of the pulley 100 as described above. For instance, it may be fixed to the central portion of the pulley 100, as shown at 110S in FIG. 5.

Embodiment 2

In addition, in cases where a semiconductor acceleration sensor is used as the above-mentioned acceleration sensor, there might be developed an output error (hereinafter referred to as a temperature drift) due to the influence of the ambient temperature. In particular, elevators can be used in severe environments with large temperature changes, and hence it is necessary to give enough consideration to the influences caused by a change in temperature of the acceleration sensor. Thus, in this embodiment, such a temperature drift can be suppressed by keeping the semiconductor acceleration sensor at a constant temperature.

Figure 6:
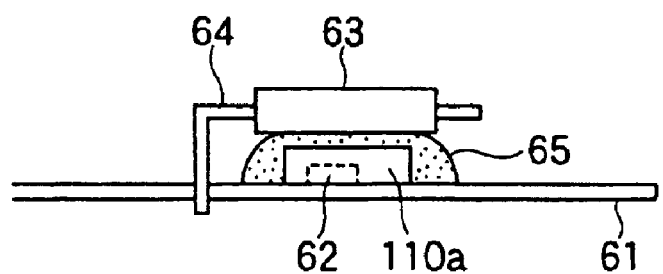
FIG. 6 is a view showing the construction surrounding a semiconductor acceleration sensor used with the load detection apparatus for an elevator according to the present invention.

FIG. 6 is a view which shows the construction in surroundings of the semiconductor acceleration sensor used with a load detection apparatus for an elevator according to this embodiment. In FIG. 6, 110a designates a semiconductor acceleration sensor which constitutes the acceleration sensor as explained in the above-mentioned first embodiment, and 61 designates a printed circuit board for mounting a semiconductor thereon. 62 designates a temperature measurement and heater drive circuit which includes a thermistor built in a chip of the semiconductor acceleration sensor 110a for measuring the temperature thereof, and a differential amplifier for driving a heater based on a relation between the measured temperature and a prescribed reference temperature.

63 designates a heater transistor which serves as the heater achieved for instance by a collector loss of the transistor to keep the semiconductor acceleration sensor 110a at a constant temperature. 64 designates a lead which supports the heater transistor 63 on the semiconductor acceleration sensor 110a and provides an electrical connection therebetween. 65 designates a resin or an adhesive formed of a high heat-conductive material for improving the thermal conductivity between the semiconductor acceleration sensor 110a and the heater transistor 63. This resin or adhesive 65 is inserted between the semiconductor acceleration sensor 110a and the heater transistor 63, and the semiconductor acceleration sensor 110a is covered with the adhesive 65 (shown perspectively in FIG. 6).

Figure 7:
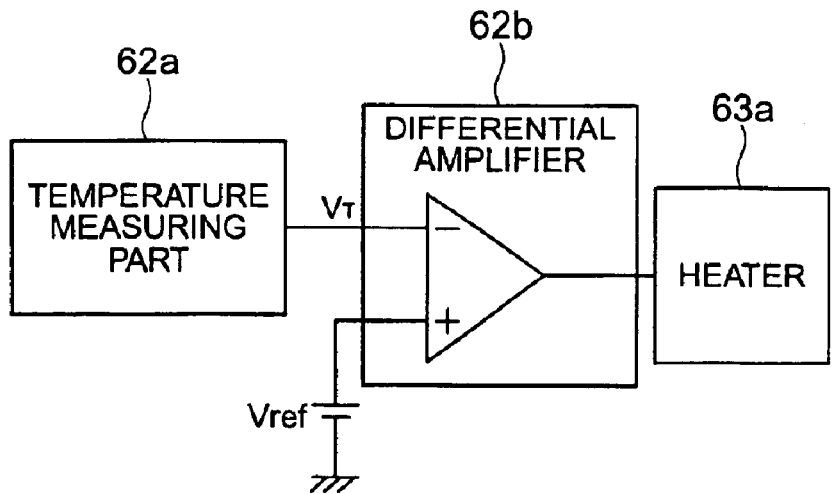
FIG. 7 is a block diagram generally showing the construction of a temperature maintaining mechanism of FIG. 6.

Moreover, FIG. 7 is a block diagram which generally shows the construction of a temperature maintaining mechanism of FIG. 6. 62a designates a temperature measuring part which is constituted by a thermistor for instance, and 62b designates a differential amplifier which is adapted to drive the heater based on a relation between a voltage $V_T$ corresponding to the temperature measured by the temperature measuring part 62a and a reference voltage Vref corresponding to a prescribed reference temperature, these members 62a, 62b being equivalent to the temperature measurement and heater drive circuit 62 of FIG. 6. 63a designates a heater which is adapted to be driven in accordance with the output of the differential amplifier 62b, and which is equivalent to or corresponds to the heater transistor 63 in FIG. 6.

As shown in FIG. 7, a negative feedback loop is constructed such that the higher the temperature of the semiconductor acceleration sensor 110a measured by the temperature measuring part 62a (i.e., the greater the voltage $V_T$), the lesser becomes the heat generated by the heater 63a. With such a construction, by controlling the heater in such a manner that the temperature in the semiconductor acceleration sensor 110a is kept constant, the semiconductor acceleration sensor 110a is maintained at a constant temperature, thereby reducing a drift according to temperature variations.

When the temperature is controlled to be constant, the reference voltage Vref in the differential amplifier 62b corresponding to the reference temperature has only to be set to a value equal to or higher than the voltage corresponding to the highest ambient temperature at which the semiconductor acceleration sensor 100a is used. The heater 63a is required to have the heater capacity for heating the semiconductor acceleration sensor to the above-mentioned highest ambient temperature even when the ambient temperature is the lowest. With such an arrangement, the semiconductor acceleration sensor 110a can be kept at a constant temperature over the entire operating temperature range.

Figure 8:
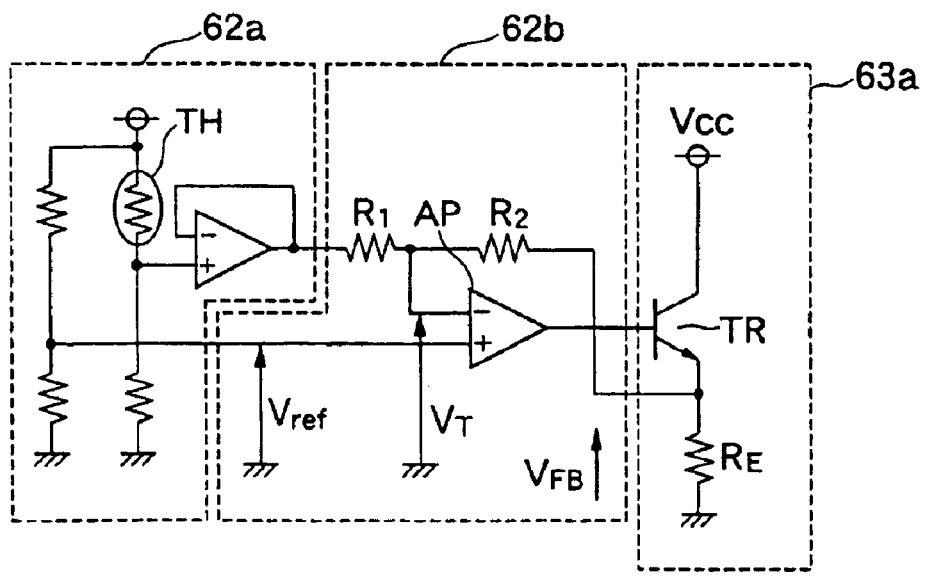
FIG. 8 is a view showing one example of a circuit structure of the temperature maintaining mechanism shown in FIG. 6 and FIG. 7.
Figure 9:
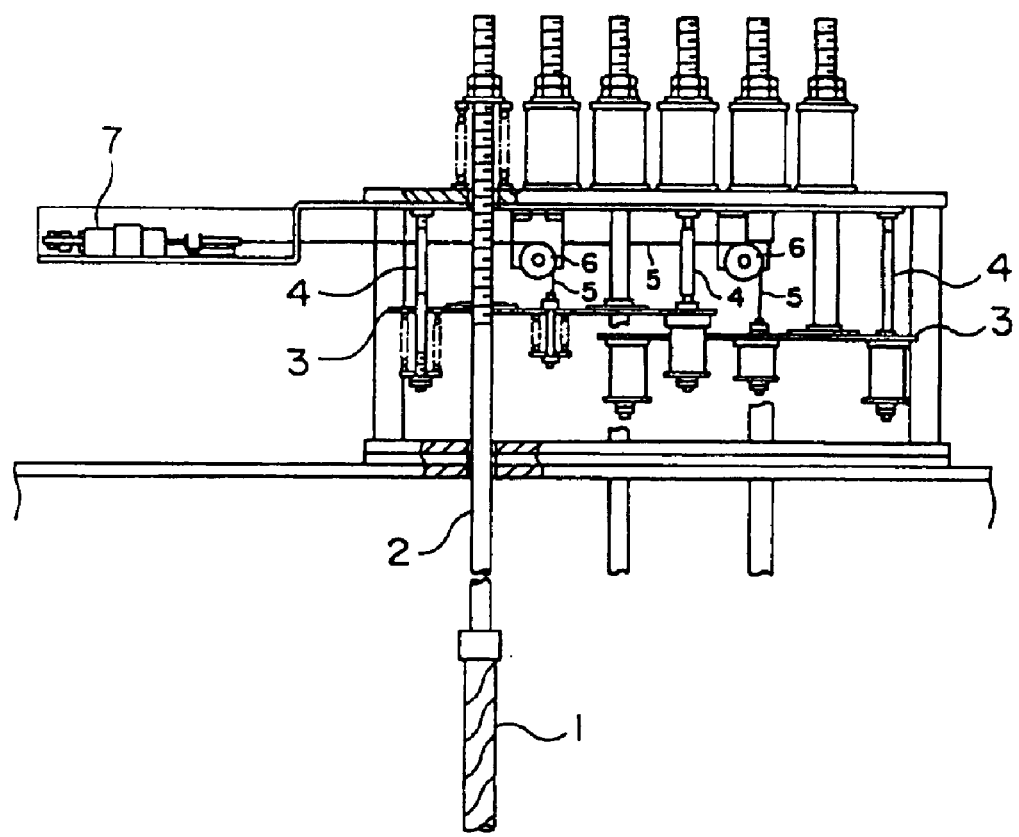
FIG. 9 is a view showing the construction of a conventional load detection apparatus for an elevator.

FIG. 8 illustrates one example of a concrete circuit structure of the temperature maintaining mechanism shown in FIG. 6 and FIG. 7. The temperature measuring part 62a includes a thermistor TH, and the differential amplifier 62b includes a differential amplifier AP, and the heater 63a includes a transistor TR which exhibits a heater effect due to a collector loss.

The total loss generated by the transistor TR is expressed as follows:

$$P_L \approx (Vcc - V_{FB}) \cdot (V_{FB}/R_E)$$

where $V_{FB}$ is expressed as follows:

$$V_{FB} = Vcc - (Vref - V_T)(R_2/R_1).$$

INDUSTRIAL APPLICABILTY

As described above, according to the present invention, a load detection apparatus for an elevator is characterized in that the displacement of a shackle, which is coupled with a main rope hanging an elevator car, caused in accordance with the loading capacity of the car is converted through a wire into the rotary motion of a pulley which has a rotating surface positioned substantially in a vertical posture, and an acceleration sensor for detecting the angle of rotation of the pulley is fixedly secured to the pulley, so that the loading capacity of the car is detected from the angle of rotation of the pulley. Accordingly, by making unnecessary differential transformers each of which requires an installation space and has sliding portions, it is possible to reduce the installation space and maintain the stable detection operation of the apparatus for a long period of time.

In addition, in order to generate a frictional force between the wire and the pulley so as to prevent slippage of the wire, a spring is connected with that end of the wire which is opposite to its end near the shackle for pulling the wire in a direction toward the pulley. Thus, accurate detection can be performed.

Moreover, in order to generate a frictional force between the wire and the pulley so as to prevent slippage of the wire, a weight is hung from that end of the wire which is opposite to its end near the shackle for pulling the wire in a direction toward the pulley. Thus, it is possible to carry out accurate detection.

Further, in order to detect the displacement of the shackle, provision is made for a detection board having a surface which is coupled with the shackle in a perpendicular relation thereto so as to be displaced together with the shackle, the wire being connected with the detection board. Accordingly, accurate detection can be performed.

Furthermore, the acceleration sensor is fixedly secured to an outer periphery side of the pulley. Thus, the angle of rotation can be detected on the outer peripheral side of the pulley, so that the loading capacity of a car can be detected based thereon.

Still further, the acceleration sensor is fixedly secured to the center of the pulley. Thus, the angle of rotation can be detected at the center of the pulley, so that the loading capacity of a car can be detected based thereon. In addition, it is possible to avoid deterioration in the rotational balance of the pulley.

Moreover, the acceleration sensor comprises a semiconductor acceleration sensor, and a temperature maintaining mechanism is provided for maintaining the semiconductor acceleration sensor at a constant temperature. Accordingly, it is possible to achieve space-saving and maintain the stability in the detection operation even if there is a change in the ambient temperature.

Further, the temperature maintaining mechanism comprises: a temperature measuring part for measuring the temperature of the semiconductor acceleration sensor; a heater for heating the semiconductor acceleration sensor; and a differential amplifier for driving the heater based on a comparison between the temperature measured by the temperature measuring part and a prescribed reference temperature. Thus, with a simple structure, it is possible to achieve space-saving and maintain the stability in the detection operation even if there is a change in the ambient temperature.

Furthermore, a chip of the semiconductor acceleration sensor is mounted on a printed circuit board, and the temperature measuring part and the differential amplifier are constituted by a temperature measurement and heater drive circuit built into the semiconductor acceleration sensor chip, and the heater is constituted by a heater transistor supported on the semiconductor acceleration sensor chip by means of a lead. Thus, with a simple structure, it is possible to achieve space-saving and maintain the stability in the detection operation even if there is a change in the ambient temperature.

In addition, the temperature measurement and heater drive circuit comprises a thermistor and a differential amplifier, and the heater transistor comprises a transistor which generates heat by use of a collector loss of the transistor. Accordingly, with a simple structure, it is possible to achieve space-saving and maintain the stability in the detection operation even if there is a change in the ambient temperature.

Moreover, a high heat-conductive material is inserted between the semiconductor acceleration sensor chip and the heater transistor. Thus, the heat conduction between the semiconductor acceleration sensor chip and the heater transistor can be improved, thereby making it possible to enhance the heating efficiency and suppress the power consumption of the heater transistor.

What is claimed is:

1. A load detection apparatus for an elevator comprising:
   a shackle;
   a main rope suspending and vertically transporting an elevator car and coupled to the shackle;
   a pulley which has a substantially vertical rotating surface; and
   an acceleration sensor for detecting angle of rotation of the pulley, fixedly secured to the pulley, wherein the shackle is displaced in accordance with loading of the elevator car, and displacement of the shackle induces rotation of the pulley via a wire so that the loading of the car is detected from the angle of rotation of the pulley detected by the acceleration sensor.

2. The load detection apparatus for an elevator according to claim 1, including a spring connected to an end of the wire remote from the shackle and pulling the wire toward the pulley to generate a frictional force between the wire and the pulley to prevent slippage of the wire.

3. The load detection apparatus for an elevator according to claim 1, including a weight hung from an end of the wire remote from the shackle and pulling the wire toward the pulley to generate a frictional force between the wire and the pulley to prevent slippage of the wire.

4. The load detection apparatus for an elevator according to claim 1, including a detection board having a surface coupled to the shackle, in a perpendicular relation to the shackle, and displaced together with the shackle, the wire being connected to the detection board.

5. The load detection apparatus for an elevator according to claim 1, wherein the acceleration sensor is fixedly secured to an outer periphery side of the pulley.

6. The load detection apparatus for an elevator according to claim 1, wherein the acceleration sensor is fixedly secured centrally to the pulley.

7. The load detection apparatus for an elevator according to claim 1, wherein the acceleration sensor comprises a semiconductor acceleration sensor, and including a temperature maintaining mechanism for maintaining the semiconductor acceleration sensor at a constant temperature.

8. The load detection apparatus for an elevator according to claim 7, wherein the temperature maintaining mechanism comprises:
   a temperature measuring part for measuring the temperature of the semiconductor acceleration sensor;
   a heater for heating the semiconductor acceleration sensor; and
   a differential amplifier for driving the heater based on a comparison between the temperature measured by the temperature measuring part and a reference temperature.

9. The load detection apparatus for an elevator according to claim 8, wherein the semiconductor acceleration sensor includes a chip mounted on a printed circuit board, and the temperature measuring part and the differential amplifier include a temperature measurement and a heater drive circuit built into the chip, and the heater includes a heater transistor supported on the chip by a lead.

10. The load detection apparatus for an elevator according to claim 9, wherein the temperature measuring part and the heater drive circuit comprise a thermistor and a differential amplifier, and the heater transistor comprises a transistor which generates heat by collector loss of the transistor.

11. The load detection apparatus for an elevator according to claim 9, including a high heat-conductivity material inserted between the chip and the heater transistor.

* * * * *